United States Patent
Yang et al.

(10) Patent No.: US 9,560,640 B2
(45) Date of Patent: Jan. 31, 2017

(54) METHOD AND APPARATUS FOR TRANSMITTING CONTROL INFORMATION

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 14/410,541

(22) PCT Filed: Jul. 15, 2013

(86) PCT No.: PCT/KR2013/006306
§ 371 (c)(1),
(2) Date: Dec. 22, 2014

(87) PCT Pub. No.: WO2014/011007
PCT Pub. Date: Jan. 16, 2014

(65) Prior Publication Data
US 2015/0351091 A1    Dec. 3, 2015

Related U.S. Application Data

(60) Provisional application No. 61/671,107, filed on Jul. 13, 2012, provisional application No. 61/678,599, filed on Aug. 1, 2012.

(51) Int. Cl.
*H04W 4/00*     (2009.01)
*H04W 72/04*   (2009.01)
(Continued)

(52) U.S. Cl.
CPC ....... *H04W 72/0413* (2013.01); *H04B 7/2643* (2013.01); *H04L 1/18* (2013.01);
(Continued)

(58) Field of Classification Search
CPC .................................................. H04B 7/2643
See application file for complete search history.

(56) References Cited

U.S. PATENT DOCUMENTS

2011/0103286 A1* 5/2011 Montojo ............... H04W 48/08
370/312
2011/0249607 A1* 10/2011 Ishikura ................ H04H 20/57
370/312

(Continued)

FOREIGN PATENT DOCUMENTS

CN        102104460        6/2011

OTHER PUBLICATIONS

PCT International Application No. PCT/KR2013/006306, Written Opinion of the International Searching Authority dated Nov. 4, 2013, 16 pages.

(Continued)

*Primary Examiner* — Huy D Vu
*Assistant Examiner* — Kevin Cunningham
(74) *Attorney, Agent, or Firm* — Lee Hong Degerman Kang Waimey

(57) ABSTRACT

The present invention relates to a wireless communication system. More particularly, the present invention relates to a method and an apparatus for transmitting an uplink control signal in a carrier aggregation-based wireless communication system, the method comprising a step of receiving, at one or more cells from among a plurality of cells, one or more downlink signals in subframe #(n−k); and a step of transmitting, in subframe #n, an uplink control signal including information on the acknowledgement to the one or more downlink signals. The bit number of the information on the acknowledgement corresponding to a specific cell from among the plurality of cells in the subframe #(n−k) is given as a first value according to the transmission mode of the specific cell if the subframe #(n−k) is a first subframe, and (Continued)

given as a predetermined second value if the subframe #(n−k) is a second subframe.

8 Claims, 10 Drawing Sheets

(51) Int. Cl.
*H04B 7/26* (2006.01)
*H04L 1/18* (2006.01)
*H04L 5/00* (2006.01)

(52) U.S. Cl.
CPC .......... *H04L 5/0055* (2013.01); *H04L 5/0007* (2013.01); *H04W 72/0453* (2013.01)

(56) References Cited

U.S. PATENT DOCUMENTS

| | | | |
|---|---|---|---|
| 2012/0082157 A1* | 4/2012 | Yamada | H04L 1/0073 370/389 |
| 2012/0106408 A1 | 5/2012 | Papasakellariou et al. | |
| 2012/0287828 A1* | 11/2012 | Chen | H04L 1/1614 370/280 |
| 2012/0320805 A1* | 12/2012 | Yang | H04L 1/18 370/280 |
| 2013/0242816 A1* | 9/2013 | He | H04L 5/1469 370/280 |

OTHER PUBLICATIONS

3rd Generation Partnership Project (3GPP), "Technical Specification Group Radio Access Network; Evolved Universal Terrestrial Radio Access (E-UTRA); Physical layer procedures (Release 10)," 3GPP TS 36.213 V10.5.0, Mar. 2012, 126 pages.
CATT, "Corrections on HARQ-ACK codebook size determination," 3GPP TSG-RAN WG1 Meeting #66, R1-112559, Aug. 2011, 7 pages.
Motorola, "Introduction of Rel-10 LTE-Advanced features in 36.213," 3GPP TSG-RAN Meeting #63, R1-106450, Nov. 2010, 93 pages.
PCT International Application No. PCT/KR2013/006306, Written Opinion of the International Searching Authority dated Nov. 4, 2013, 12 pages.

* cited by examiner

The number of acknowledgement information bits corresponding to a specific cell in SF #(n-k)
- When SF #(n-k) is first SF: determined according to transmission mode
- When SF #(n-k) is second SF: determined as predetermined value

METHOD AND APPARATUS FOR TRANSMITTING CONTROL INFORMATION

CROSS-REFERENCE TO RELATED APPLICATIONS

This application is the National Stage filing under 35 U.S.C. 371 of International Application No. PCT/KR2013/006306, filed on Jul. 15, 2013, which claims the benefit of U.S. Provisional Application Ser. No. 61/671,107, filed on Jul. 13, 2012 and 61/678,599, filed on Aug. 1, 2012, the contents of which are all hereby incorporated by reference herein in their entirety.

TECHNICAL FIELD

The present invention relates to a wireless communication system and, more specifically, to a method for transmitting control information and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting control information in a wireless communication system and an apparatus therefor. Specifically, an object of the present invention is to provide a method for efficiently transmitting acknowledgement information and efficiently managing resources for the acknowledgement information and an apparatus therefor.

The technical problems solved by the present invention are not limited to the above technical problems and those skilled in the art may understand other technical problems from the following description.

Technical Solution

In an aspect of the present invention, a method for transmitting an uplink control signal by a communication apparatus for which a plurality of cells is configured in a carrier aggregation-based wireless communication system includes: receiving, in one or more cells from among the plurality of cells, one or more downlink signals in subframe #(n−k); and transmitting, in subframe #n, an uplink control signal including acknowledgement information on the one or more downlink signals, wherein the number of acknowledgement information bits corresponding to a specific cell from among the plurality of cells in the subframe #(n−k) is given as a first value according to a transmission mode of the specific cell when the subframe #(n−k) is a first subframe, and given as a predetermined second value when the subframe #(n−k) is a second subframe.

In another aspect of the present invention, provided herein is a communication apparatus configured to transmit an uplink control signal in a carrier aggregation-based wireless communication system, including: a radio frequency (RF) unit; and a processor, wherein the processor is configured to receive, in one or more cells from among a plurality of cells, one or more downlink signals in subframe #(n−k) and to transmit, in subframe #n, an uplink control signal including acknowledgement information on the one or more downlink signals, wherein the number of acknowledgement information bits corresponding to a specific cell from among the plurality of cells in the subframe #(n−k) is given as a first value according to a transmission mode of the specific cell when the subframe #(n−k) is a first subframe, and given as a predetermined second value when the subframe #(n−k) is a second subframe.

The first subframe may be a non-MBSFN (Multicast Broadcast Single Frequency Network) subframe and the second subframe may be an MBSFN subframe.

The first value may be 1 or 2 according to a transmission mode and the predetermined second value may be 1 when the specific cell is a primary cell (PCell) and 0 when the specific cell is a secondary cell (SCell).

The specific cell may be a cell composed of a specific number of resource blocks (RBs) or less, the first subframe may be a subframe having no broadcast channel and synchronization channel, and the second subframe may be a subframe having at least one of a broadcast channel and a synchronization channel.

The first subframe may include a downlink (DL) subframe and a first special subframe and the second subframe may include a second special subframe, wherein the first special subframe is a subframe in which the number of orthogonal frequency division multiplexing (OFDM) symbols reserved for DL transmission is greater than N and the second special subframe is a subframe in which the number of OFDM symbols reserved for DL transmission is equal to or less than N.

The first value may differ from the predetermined second value.

The uplink control signal may be transmitted using a physical uplink control channel (PUCCH) format 3 or a channel selection scheme.

Advantageous Effects

According to embodiments of the present invention, it is possible to efficiently transmit control information. Specifically, it is possible to efficiently transmit acknowledgement information and efficiently manage resources for the acknowledgement information.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
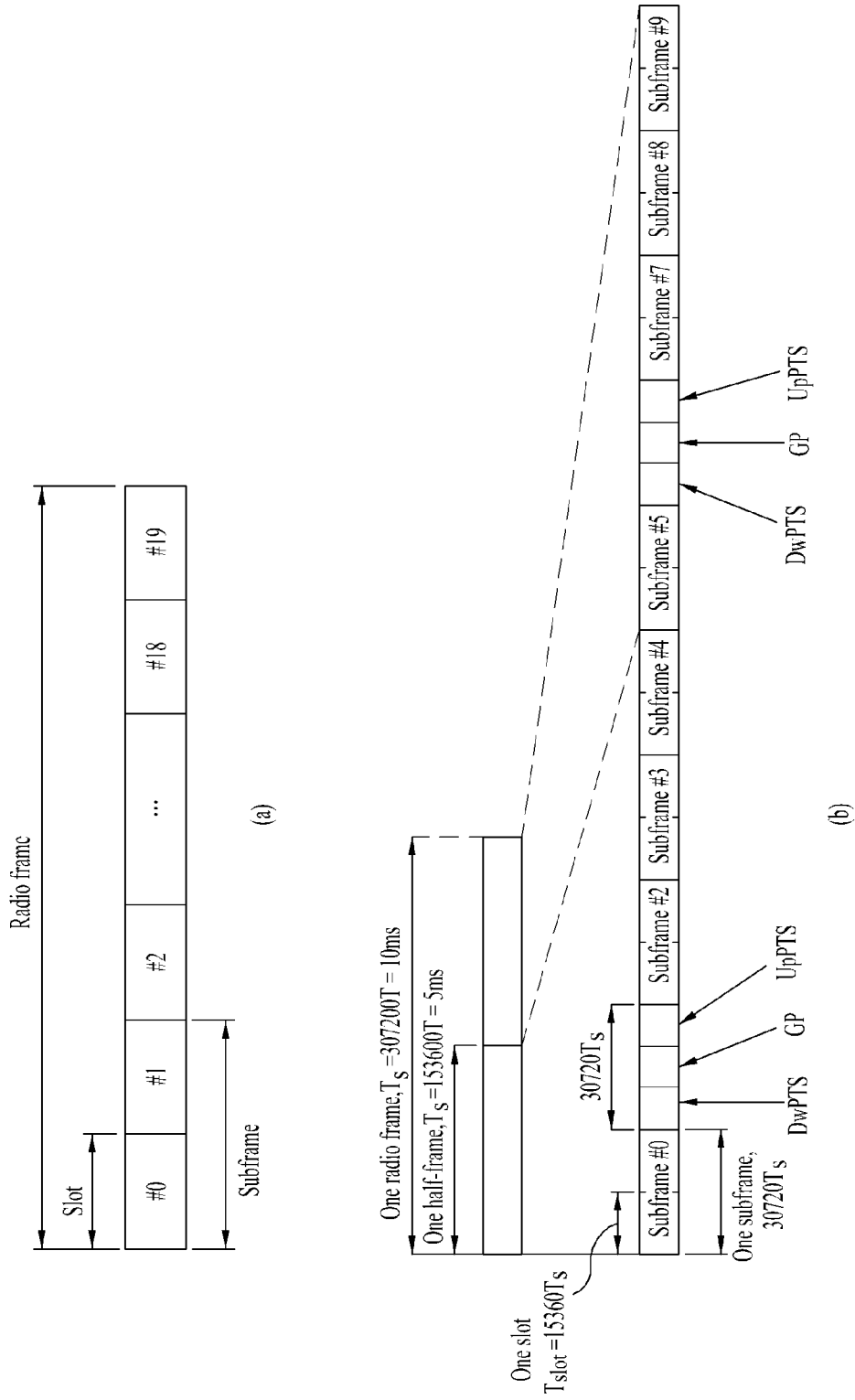
FIG. 1 illustrates a radio frame structure.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

The terms used in the specification are described.

HARQ-ACK (Hybrid Automatic Repeat request-Acknowledgement): This represents an acknowledgment response to downlink transmission (e.g. PDSCH or SPS release PDCCH), that is, an ACK/NACK/DTX response (simply, ACK/NACK response, ACK/NACK). The ACK/NACK/DTX response refers to ACK, NACK, DTX or NACK/DTX. HARQ-ACK for a specific CC or HARQ-ACK of a specific CC refers to an ACK/NACK response to a downlink signal related to (e.g. scheduled for) the corresponding CC. A PDSCH can be replaced by a transport block (TB) or a codeword.

PDSCH: This corresponds to a DL grant PDCCH. The PDSCH is used interchangeably with a PDSCH w/ PDCCH in the specification.

SPS release PDCCH: This refers to a PDCCH indicating SPS release. A UE performs uplink feedback of ACK/NACK information about an SPS release PDCCH.

SPS PDSCH: This is a PDSCH transmitted on DL using a resource semi-statically set according to SPS. The SPS PDSCH has no DL grant PDCCH corresponding thereto. The SPS PDSCH is used interchangeably with a PDSCH w/o PDCCH in the specification.

PUCCH index: This corresponds to a PUCCH resource. The PUCCH index represents a PUCCH resource index, for example. The PUCCH resource index is mapped to at least one of an orthogonal cover (OC), a cyclic shift (CS) and a PRB.

ARI (ACK/NACK resource indicator): This is used to indicate a PUCCH resource. For example, the ARI can be used to indicate a resource change value (e.g. offset) with respect to a specific PUCCH resource (group) (configured by a higher layer). Furthermore, the ARI can be used to indicate a specific PUCCH resource (group) index in a PUCCH resource (group) set (configured by a higher layer). The ARI can be included in a TPC field of a PDCCH corresponding to a PDSCH on an SCC. PUCCH power control is performed in a TPC field in a PDCCH (that is, PDCCH corresponding to a PDSCH on a PCC) that schedules the PCC. The ARI can be included in a TPC field of a PDCCH other than a PDCCH that has a downlink assignment index (DAI) initial value and schedules a specific cell (e.g. PCell). The ARI is used with a HARQ-ACK resource indication value.

DAI (downlink assignment index): This is included in DCI transmitted through a PDCCH. The DAI can indicate an order value or counter value of a PDCCH. A value indicated by a DAI field of a DL grant PDCCH is called a DL DAI and a value indicated by a DAI field of a UL grant PDCCH is called a UL DAI for convenience.

Implicit PUCCH resource: This represents a PUCCH resource/index linked to the smallest CCE index of a PDCCH that schedules a PCC (refer to Equation 1).

Explicit PUCCH resource: This can be indicated using the ARI.

PDCCH scheduling CC: This represents a PDCCH that schedules a PDSCH on a CC, that is, a PDCCH corresponding to a PDSCH on the CC.

PCC (Primary Component Carrier) PDCCH: This represents a PDCCH that schedules a PCC. That is, the PCC PDCCH indicates a PDCCH corresponding to a PDSCH on the PCC. When it is assumed that cross-carrier scheduling is not allowed for the PCC, the PCC PDCCH is transmitted only on the PCC. The PCC is used interchangeably with a PCell (Primary Cell).

SCC (Secondary Component Carrier) PDCCH: This represents a PDCCH that schedules an SCC. That is, the SCC PDCCH indicates a PDCCH corresponding to a PDSCH on the SCC. When cross-carrier scheduling is allowed for the SCC, the SCC PDCCH can be transmitted on a CC (e.g. PCC) other than the corresponding SCC. The SCC is used interchangeably with a SCell (Secondary Cell).

Cross-CC scheduling: This represents an operation of transmitting a PDCCH that schedules an SCC through a CC (e.g. PCC) other than the SCC. Specifically, this refers to an operation of scheduling/transmitting all PDCCHs only through one PCC when only two CCs, that is, a PCC and an SCC are present.

Non-cross-CC scheduling: This refers to an operation of scheduling/transmitting a PDCCH that schedules each CC through the corresponding CC.

FIG. 1 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. LTE/LTE-A supports a type-1 radio frame structure applicable to FDD (Frequency Division Duplex) and a type-2 radio frame structure applicable to TDD (Time Division Duplex).

FIG. 1(a) illustrates a type-1 radio frame structure. A downlink subframe includes 10 subframes each of which includes 2 slots in the time domain. For example, each subframe has a length of 1 ms and each slot has a length of 0.5 ms. A slot includes a plurality of orthogonal frequency division multiplexing (OFDM) symbols in the time domain and includes a plurality of resource blocks (RBs) in the frequency domain. The number of OFDM symbols included in one slot may depend on cyclic prefix (CP) configuration. For example, the number of OFDM symbols included in one slot may be 7 in a normal CPO case and 6 in an extended CP case. An OFDM symbol may be replaced by a single carrier frequency division multiple access (SC-FDMA) symbol.

FIG. 2(b) illustrates a type-2 radio frame structure. The type-2 radio frame structure. Each half frame includes 5 subframes each of which is composed of 2 slots.

Table 1 shows UL-DL configurations of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe.

The special subframe includes a DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Table 2 shows DwPTS/GP/UpPTS according to special subframe configuration. In Table 2, $T_s$ denotes sampling time.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The radio frame structure is merely exemplary and the number of subframes included in the radio frame, the number of slots included in a subframe, and the number of symbols included in a slot can be vary.

Figure 2:
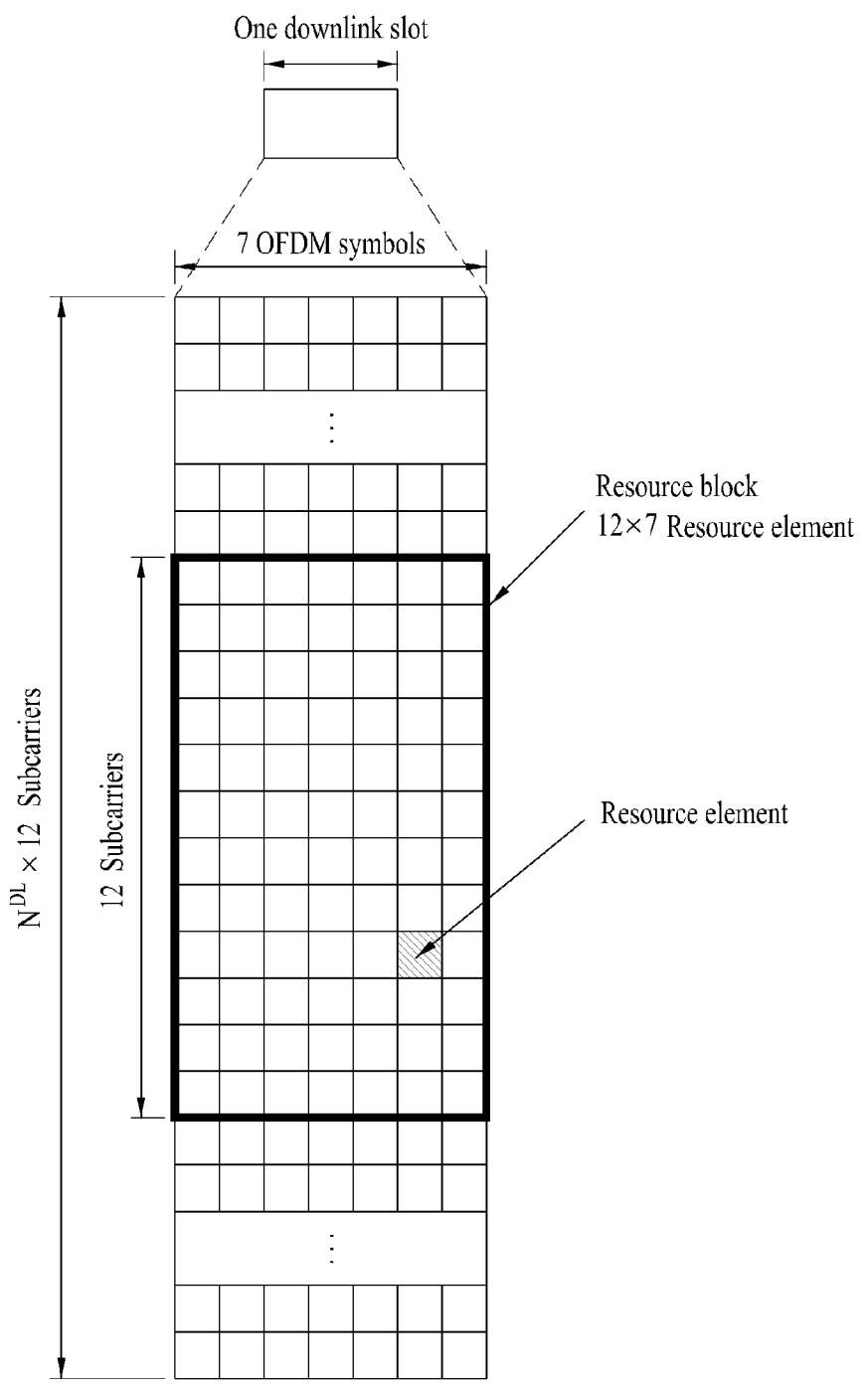
FIG. 2 illustrates a resource grid of a downlink slot.

FIG. 2 illustrates a resource grid of a downlink slot. Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). The number $N_{RB}$ of RBs depends on a system bandwidth (BW). The structure of an uplink slot may be same as that of the downlink slot except that OFDM symbols by replaced by SC-FDMA symbols.

Figure 3:
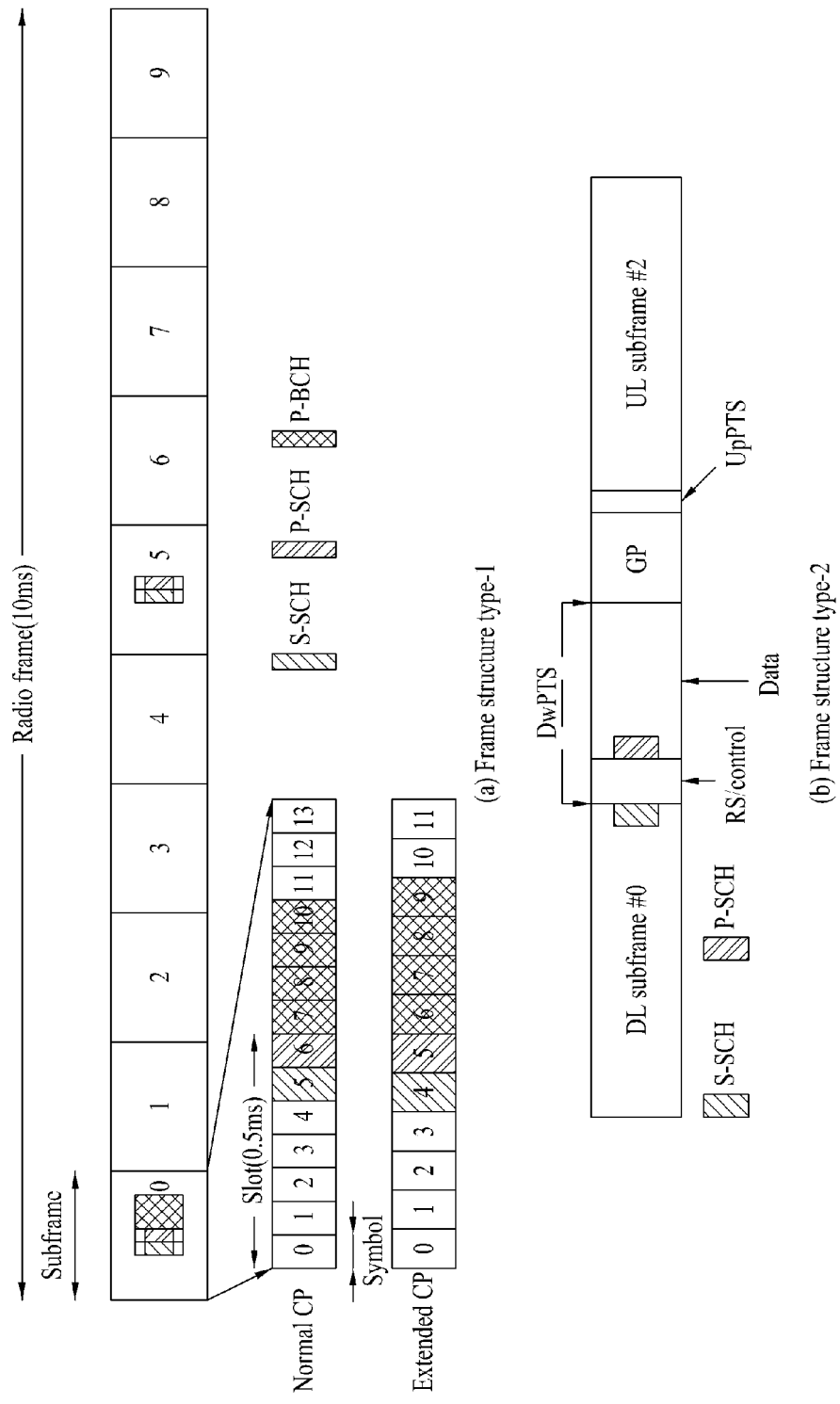
FIG. 3 illustrates configurations of a synchronization channel and a broadcast channel.

FIG. 3 illustrates a primary broadcast channel (P-BCH) and a synchronization channel (SCH). The SCH includes a primary SCH (P-SCH) and a secondary SCH (S-SCH). The P-SCH carries a primary synchronization signal (PSS) and the S-SCH carries a secondary synchronization signal (SSS).

Referring to FIG. 3, in frame structure type-1 (i.e. FDD), the P-SCH is disposed at the last OFDM symbols of slot #0 (i.e. the first slot of subframe #0) and slot #10 (i.e. the first slot of subframe #5) in each radio frame. The S-SCH is disposed at OFDM symbols immediately before the last OFDM symbols of slot #0 and slot #10 in each radio frame. The S-SCH and the P-SCH are located at neighboring OFDM symbols. In frame structure type-2 (i.e. TDD), the P-SCH is transmitted through third OFDM symbols of subframe #1/#6 and the S-SCH is disposed at the last OFDM symbols of slot #1 (i.e. the second slot of subframe #0) and slot #11 (i.e. the second slot of subframe #5). The P-BCH is transmitted for every four radio frames using first to fourth OFDM symbols of the second slot of subframe #0, irrespective of frame structure type. The P-SCH is transmitted using 72 subcarriers (10 subcarriers being reserved and 62 subcarriers carrying the PSS) on the basis of a direct current (DC) subcarrier in OFDM symbols. The S-SCH is transmitted using 72 subcarriers (10 subcarriers being reserved and 62 subcarriers carrying the SSS) on the basis of a DC subcarrier in OFDM symbols. The P-BCH is mapped to 72 subcarriers on the basis of 4 OFDM symbols and DC subcarrier in one subframe.

Figure 4:
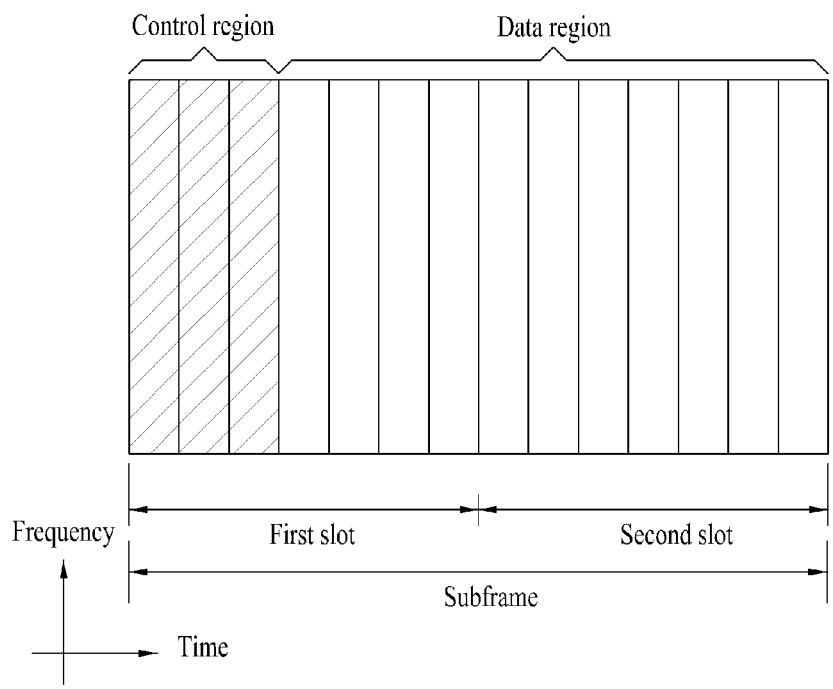
FIG. 4 illustrates a downlink subframe structure.

FIG. 4 illustrates a downlink subframe structure.

Referring to FIG. 4, a maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift for a DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. A UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. A BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, then an identifier (e.g., cell-RNTI (C-RNTI)) of the UE may be masked to the CRC. Alternatively, when the PDCCH is for a paging message, a paging identifier (e.g., paging-RNTI (P-RNTI)) may be masked to the CRC. When the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
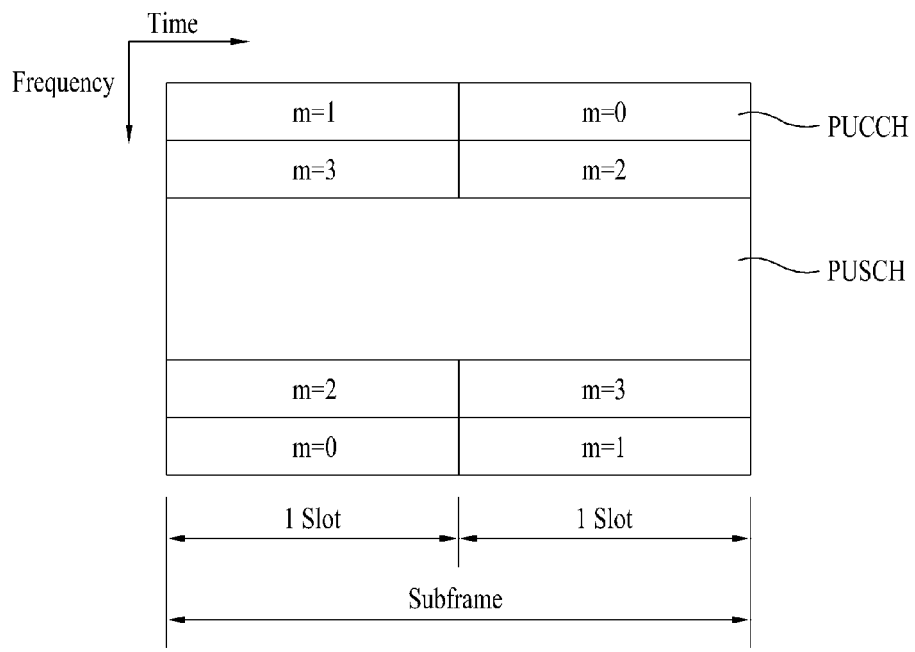
FIG. 5 illustrates an uplink subframe structure.

FIG. 5 illustrates an uplink subframe structure.

Referring to FIG. 5, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ-ACK: This is a response to a downlink data packet (e.g. codeword) on a PDSCH and indicates whether the downlink data packet has been successfully received. A 1-bit A/N signal is transmitted as a response to a single downlink codeword and a 2-bit A/N signal is transmitted as a response to two downlink codewords.

Channel Quality Indicator (CQI): This is feedback information about a downlink channel. MIMO (Multiple Input Multiple Output)-related feedback information includes a rank indicator (RI), a precoding matrix indicator (PMI) and a precoding type indicator (PTI). 20 bits per subframe are used.

Table 3 shows the mapping relationship between PUCCH formats and UCI in LTE/LTE-A.

TABLE 3

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20+1 coded bits) |
| Format 2b | CQI and 2-bit HARQ ACK/NACK (20+2 coded bits) |
| Format 3 (LTE-A) | HARQ ACK/NACK + SR (48 bits) |

Figure 6:
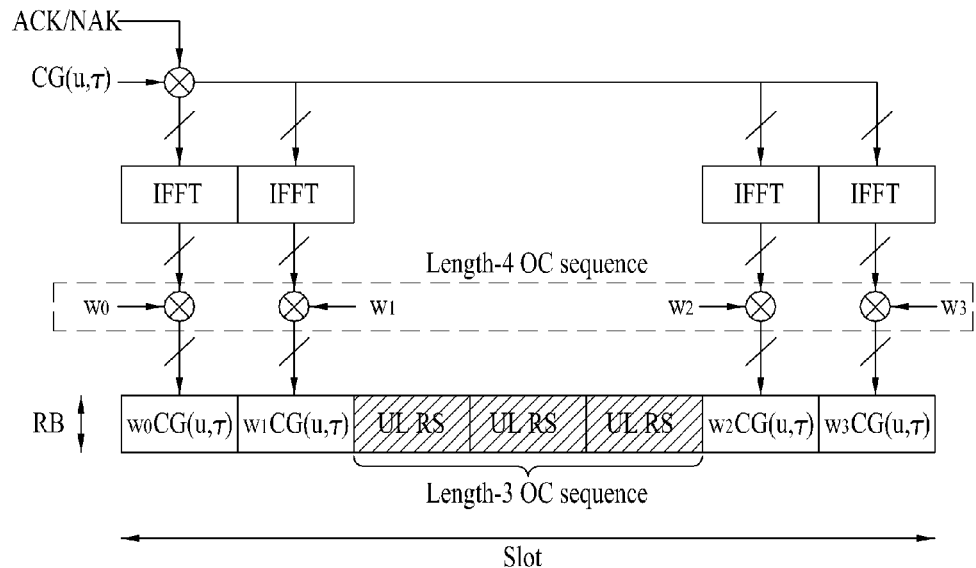
FIG. 6 illustrates a slot level structure of physical uplink control channel (PUCCH) format 1a/1b.

FIG. 6 illustrates a slot level structure of PUCCH format 1a/1b.

Referring to FIG. 6, 1-bit [b(0)] and 2-bit [b(0)b(1)] A/N information are modulated according to BPSK (binary phase shift keying) and QPSK (quadrature phase shift keying) modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (NACK). Table 4 shows a modulation table defined for PUCCH formats 1a and 1b in LTE.

TABLE 4

| PUCCH format | b(0), . . . , b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

In PUCCH format 1a/1b, cyclic shift (CS) ($\alpha_{cs,x}$) is performed in the frequency domain and spreading is performed using an orthogonal code (OC) (e.g. Walsh-Hadamard or DFT code) w0, w1, w2, w3 in the time domain.

Figure 7:
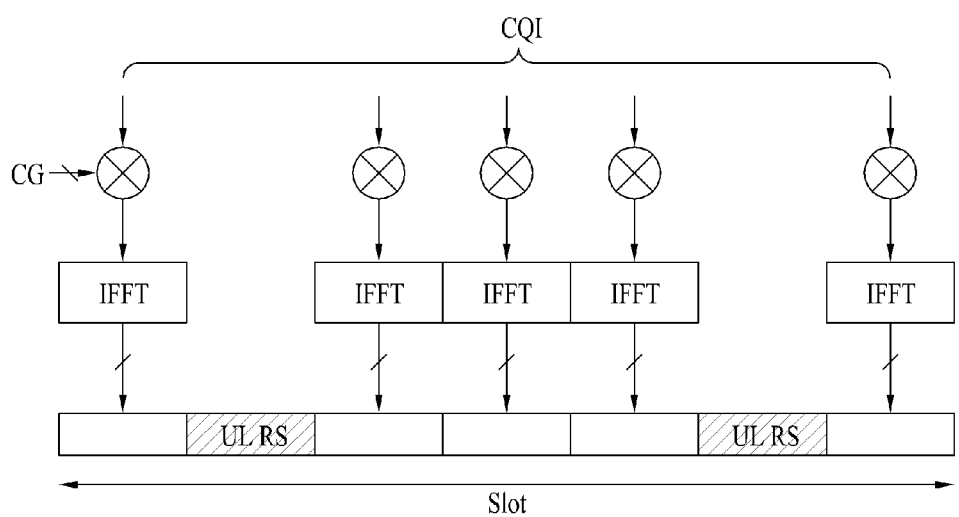
FIG. 7 illustrates a slot level structure of PUCCH format 2/2a/2b.

FIG. 7 illustrates PUCCH format 2/2a/2b.

Referring to FIG. 7, PUCCH format 2/2a/2b includes 5 QPSK data symbols and 2 RS symbols at the slot level in a normal CP case. PUCCH format 2/2a/2b includes 5 QPSK data symbols and 1 RS symbol at slot level in an extended CP case. In the extended CP case, the RS symbol is disposed at the fourth SC-FDMA symbol in each slot. Accordingly, PUCCH format 2/2a/2b can carry a total of 10 QPSK data symbols. The QPSK symbols are spread in the frequency domain according to CS and then mapped to corresponding SC-FDMA symbols. The RS can be multiplexed using CS through code division multiplexing (CDM).

A/N transmission and CQI transmission may be required in the same subframe. In this case, when "A/N+CQI simultaneous transmission is not allowed" ("Simultaneous-AN-and-CQI" parameter=OFF) is set by a higher layer, only A/N transmission is performed using PUCCH format 1a/1b and CQI transmission is dropped. When "A/N+CQI simultaneous transmission is allowed" ("Simultaneous-AN-and-CQI" parameter=ON) is set, the A/N and CQI are simultaneously transmitted through PUCCH format 2/2a/2b. Specifically, the A/N is embedded in the second RS (e.g. multiplied by the RS) of each slot in PUCCH format 2a/2b in the normal CP case. The A/N and CQI are joint-coded and then transmitted through PUCCH format 2 in the extended CP case.

Figure 8:
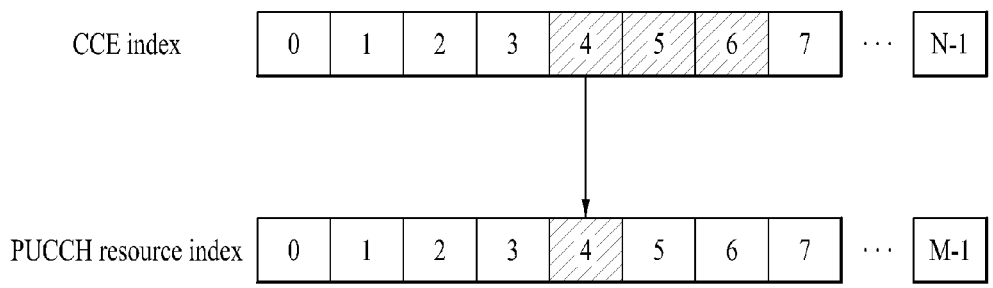
FIG. 8 illustrates an example of determining PUCCH resources for ACK/NACK (Acknowledgement/Negative Acknowledgement) transmission

FIG. 8 illustrates an example of determining PUCCH resources for A/N. In LTE/LTE-A, a plurality of PUCCH resources for A/N are shared by a plurality of UEs in a cell every time the UEs need the PUCCH resources rather than allocated to UEs in advance. Specifically, a PUCCH resource used by a UE to transmit an A/N signal corresponds to a PDCCH on which scheduling information on DL data involving the A/N signal is delivered or a PDCCH indicating SPS release. A PDCCH transmitted in a DL subframe to a UE is configured with one or more control channel elements (CCEs). The UE can transmit A/N through a PUCCH resource corresponding to a specific one (e.g. first CCE) of the CCEs constituting the PDCCH. When information on a PDSCH is delivered on a PDCCH composed of CCEs #4, #5 and #6, as shown in FIG. 8, a UE transmits an A/N signal on PUCCH #4 corresponding to CCE #4, the first CCE of the PDCCH.

Specifically, a PUCCH resource index in LTE/LTE-A is determined as follows.

$$n^{(1)}_{PUCCH} = n_{CCE} + N^{(1)}_{PUCCH} \quad \text{[Equation 1]}$$

Here, n $n^{(1)}_{PUCCH}$ represents a resource index of PUCCH format 1a/1b for ACK/NACK/DTX transmission, $N^{PUCCH}_{(1)}$ denotes a signaling value received from a higher layer, and $n_{CCE}$ denotes the smallest value of CCE indexes used for PDCCH transmission. A CS, OC and PRB for PUCCH format 1a/1b are obtained from $n^{(1)}_{PUCCH}$.

Since LTE UEs cannot simultaneously transmit a PUCCH and a PUSCH, UCI (e.g. a CQI/PMI, HARQ-ACK, RI or the like) is multiplexed to a PUSCH region (PUSCH piggybacking) when the UCI needs to be transmitted in a subframe in which the PUSCH is transmitted. In LTE-A, a UE may be configured such that the UE cannot simultaneously transmit a PUCCH and a PUSCH. In this case, when UCI (e.g. a CQI/PMI, HARQ-ACK, RI or the like) needs to be transmitted in a subframe in which the PUSCH is transmitted, the UE can multiplex the UCI to a PUSCH region (PUSCH piggybacking).

Figure 9:
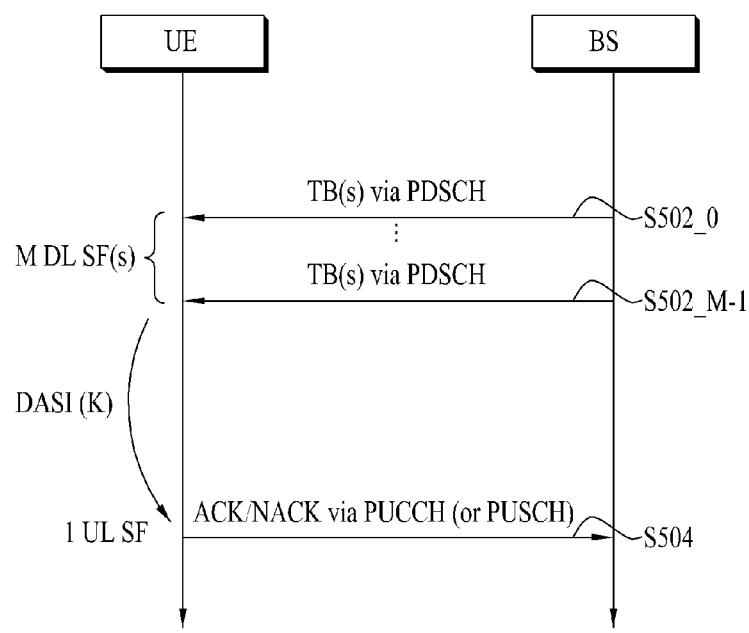
FIG. 9 illustrates an ACK/NACK transmission procedure in single cell situation.

FIG. 9 illustrates a UL/DL A/N transmission procedure in single cell situation.

Referring to FIG. 9, a UE can receive one or more DL transmission signals (e.g. PDSCH signals) in M DL subframes (SFs) (S502_0 to S502_M−1). Each PDSCH signal is used to transmit one or more (e.g. 2) transport blocks (TBs) according to transmission mode. A PDCCH signal that requires an ACK/NACK response, for example, a PDCCH signal indicating SPS (Semi-Persistent Scheduling) (simply, SPS release PDCCH signal) may also be received in step S502_0 to S502_M−1, which is not shown. When a PDSCH signal and/or an SPS release PDCCH signal is present in the M DL subframes, the UE transmits A/N through a UL subframe corresponding to the M DL subframes via processes for transmitting A/N (e.g. A/N (payload) generation, A/N resource allocation, etc.) (S504). A/N includes acknowledgement information about the PDSCH signal and/or SPS release PDCCH received in step S502_0 to S502_M−1. While A/N is transmitted through a PUCCH basically (refer to FIGS. 6 and 7), A/N may be transmitted through a PUSCH when the PUSCH is transmitted at an A/N transmission time. Various PUCCH formats shown in Table 3 can be used for A/N transmission. To reduce the number of transmitted A/N bits, various methods such as A/N bundling and A/N channel selection can be used.

M=1 in FDD, and M is an integer equal to or greater than 1 in TDD. In TDD, the relationship between M DL subframes and a UL subframe in which A/N is transmitted is determined by a DASI (Downlink Association Set Index).

Table 6 shows DASI (K: {$k_0, k_1, \ldots, k_{M-1}$}) defined in LTE/LTE-A. When a PDCCH that indicates PDSCH transmission and/or SPS release is present in a subframe n−k (k∈K), the UE transmits corresponding A/N in a subframe n.

TABLE 6

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD, the UE needs to transmit an A/N signal for at least one DL transmission signal (e.g. PDSCH), received through M DL SFs, through a single UL SF. A/N for a plurality of DL SFs is transmitted through a single UL SF as follows.

1) A/N bundling: A/N bits for a plurality of data units (e.g. PDSCH, SPS release PDCCH, etc.) are combined according to a logical operation (e.g. logic-AND operation). For example, a receiving end (e.g. UE) transmits an ACK signal upon successful decoding of all data units and transmits a NACK signal or no signal upon failure of decoding (or detection) of any one of the data units.

2) Channel selection: A UE receiving a plurality of data units (e.g. PDSCH, SPS release PDCCH, etc.) occupies a plurality of PUCCH resources for A/N transmission. A/N responses to the plurality of data units are identified by combinations of PUCCH resources used for A/N transmission and transmitted A/N (e.g. bit values and QPSK symbol values). Channel selection is also referred to as A/N selection and PUCCH selection.

Channel selection will now be described in more detail. In channel selection, a UE occupies a plurality of uplink physical channel resources (e.g. PUCCH resources) in order to transmit multiplexed A/N signals upon reception of a plurality of pieces of downlink data. For example, upon reception of a plurality of PDSCHs, the UE can occupy as many PUCCH resources as the PDSCHs using a specific CCE of a PDCCH that indicates each PDSCH. In this case, the UE can transmit multiplexed ACK/NACK signals using combinations of a PUCCH resource selected from the occupied PUCCH resources and modulation/coding information applied to the selected PUCCH resource.

Table 7 shows a mapping table for channel selection, which is defined in LTE.

TABLE 7

| HARQ-ACK(0), HARQ-ACK(1), HARQ-ACK(2), HARQ-ACK(3) | Subframe $n^{(1)}_{PUCCH,i}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 7, HARQ-ACK(i) indicates the HARQ ACK/NACK/DTX response of an i-th data unit (0≤i≤3). HARQ ACK/NACK/DTX responses include ACK, NACK, DTX and NACK/DTX. NACK/DTX represents NACK or DTX. ACK represents that a transport block (equivalent to a code block) transmitted on a PDSCH has been successfully decoded whereas NACK represents that the transport block has not been successfully decode. DTX (Discontinuous Transmission) represents PDCCH detection failure. Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 7, $n^{(1)}_{PUCCH,i}$ represents a PUCCH resource actually used for A/N transmission, and b(0)b(1) indicates two bits transmitted through the selected PUCCH resource, which are modulated using QPSK. For example, when the UE has decoded 4 data units successfully, the UE transmits bits (1, 1) to a BS through a PUCCH resource linked with n $n^{(1)}_{PUCCH,1}$. Since combinations of PUCCH resources and QPSK symbols cannot represent all available ACK/NACK suppositions, NACK and DTX are coupled except some cases (NACK/DTX, N/D).

Figure 10:
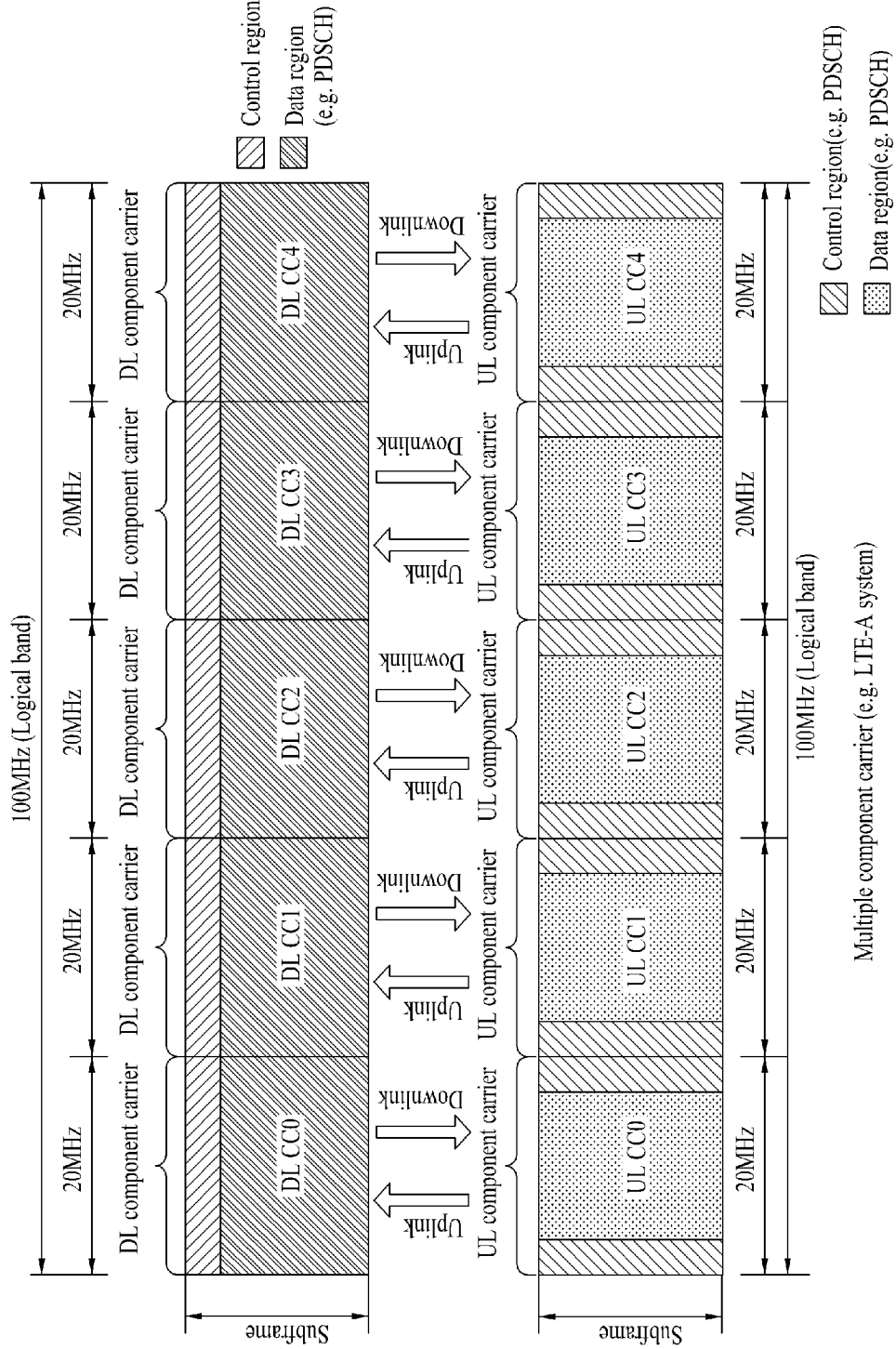
FIG. 10 illustrates a carrier aggregation (CA) communication system.

FIG. 10 illustrates a carrier aggregation (CA) communication system. LTE-A aggregates a plurality of UL/DL frequency blocks to support a wider UL/DL bandwidth in order to use a wider frequency band. Each frequency block is transmitted using a component carrier (CC). The CC may be regarded as a carrier frequency (or center carrier or a center frequency) for the corresponding frequency block.

Referring to FIG. 10, a plurality of UL/DL component carriers (CCs) can be aggregated to support a wider UL/DL bandwidth. The CCs may be contiguous or non-contiguous in the frequency domain. Bandwidths of the CCs can be independently determined Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to L (<N) CCs. Various parameters with respect to CA can be set cell-specifically, UE-group-specifically, or UE-specifically. Control information may be transmitted/received only through a specific CC. This specific CC can be referred to as a primary CC (PCC) (or anchor CC) and other CCs can be referred to as secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information when carrier aggregation is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_CONNECTED state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 11:
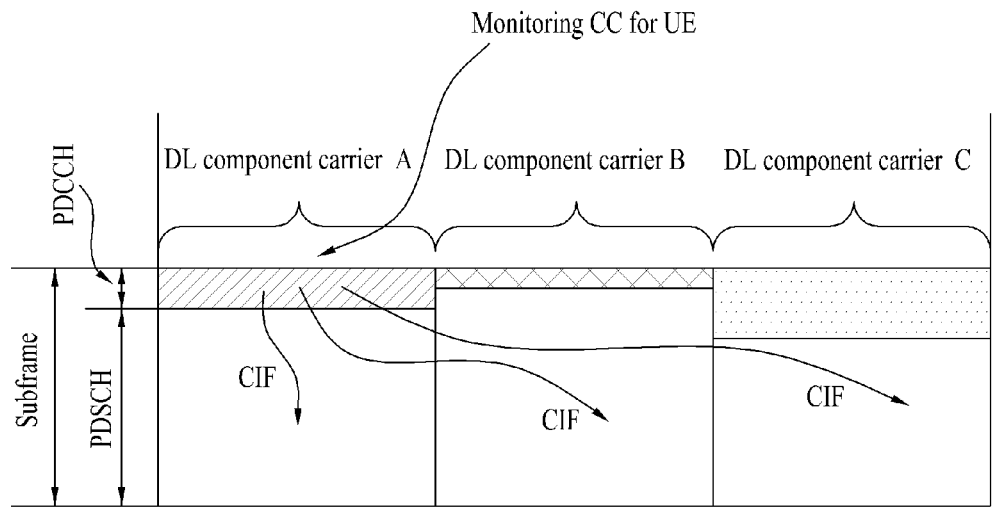
FIG. 11 illustrates scheduling when a plurality of carriers is aggregated.

FIG. 11 illustrates scheduling when a plurality of carriers is aggregated. It is assumed that 3 DL CCs are aggregated and DL CC A is set to a PDCCH monitoring DL CC in FIG. 11. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF according to LTE PDCCH rule. When the CIF is enabled, DL CC A (monitoring DL CC) can transmit not only a PDCCH that schedules the PDSCH corresponding to the DL CC A but also PDCCHs that schedule PDSCHs of other DL CCs using the CIF. In this case, A PDCCH is not transmitted in DL CC B/C which is not set to a PDCCH monitoring DL CC.

LTE-A considers two A/N transmission schemes, PUCCH format 3 and channel selection, for feedback of ACK/NACK (i.e. A/N) responses to received DL data transmitted through a plurality of cells in a CA situation. Here, an A/N codebook size (i.e. the number of A/N bits constituting A/N feedback information) is determined on the basis of the number of aggregated cells, a maximum number of transmittable transmit blocks supported by a DL transmission mode (TM) set for each cell or the number Ntb of codewords. For example, CA can be established for one UE and cell 1, cell 2 and DL TMs with Ntb=2 and Ntb=1 can be respectively set for cell 1 and cell 2 (in an FDD situation). In this case, 2-bit A/N is allocated to cell 1 and 1-bit A/N is allocated to cell2, and thus the A/N codebook size becomes 3 bits. All A/N payloads are configured in PUCCH format 3 on the basis of 3-bit RM code input in the case of PUCCH format 3, and 3-bit A/N states are configured on the basis of combinations of 3 PUCCH format 1b resources and QPSK symbols in the case of channel selection. Transport blocks correspond one-to-one to codewords and the transport block and the codewords are collectively called transport blocks unless otherwise mentioned.

Figure 12:
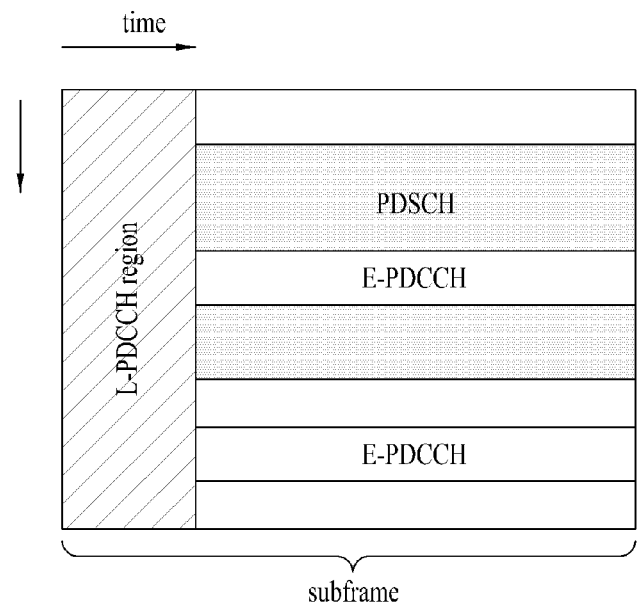
FIG. 12 illustrates an example of allocating a PDCCH to a data region of a subframe.

FIG. 12 illustrates an example of allocating a downlink physical channel to a subframe.

Referring to FIG. 12, a PDCCH (legacy PDCCH, L-PDCCH) according to LTE/LTE-A can be allocated to a control region of a subframe (refer to FIG. 4). In FIG. 12, an L-PDCCH region refers to a region to which a legacy PDCCH can be allocated. A PDCCH can be additionally allocated to a data region (e.g. a resource region for a PDSCH, refer to FIGS. 6 and 7). The PDCCH allocated to the data region is referred to as an E-PDCCH. As shown in FIG. 12, scheduling restrictions caused by limited control channel resources of the L-PDCCH region can be mitigated by additionally securing control channel resources through the E-PDCCH. Like the L-PDCCH, the E-PDCCH carries DCI. For example, the E-PDCCH can carry downlink scheduling information and uplink scheduling information. For example, a UE can receive the E-PDCCH and data/control information through a PDSCH corresponding to the E-PDCCH. In addition, the UE can receive the E-PDCCH and transmit data/control information through a PUSCH corresponding to the E-PDCCH. The E-PDCCH/PDSCH can be allocated to a subframe, starting from the first OFDM symbol of the subframe, according to cell type.

Figure 13:
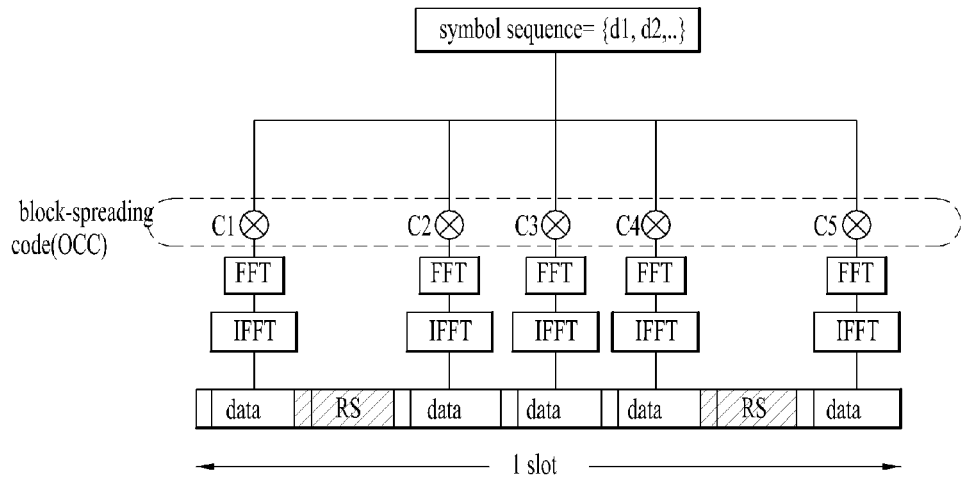
FIG. 13 illustrates an ACK/NACK transmission procedure when channel selection is set.

FIG. 13 illustrates slot level PUCCH format 3. In PUCCH format 3, a plurality of pieces of A/N information is subjected to joint coding (e.g. Reed-Muller coding, Tail-biting convolutional coding or the like), block spreading and SC-FDMA modulation and transmitted.

Referring to FIG. 13, a symbol sequence is transmitted over the frequency domain and OCC (orthogonal cover code) based time-domain spreading is applied to the symbol sequence. Control signals of a plurality of UEs can be multiplexed to the same RB using an OCC. Specifically, 5 SC-FDMA symbols (i.e. UCI data parts) are generated from one symbol sequence {d1, d2, . . . ,} using a length-5 OCC (C1 to C5). Here, the symbol sequence {d1, d2, . . . } may be a modulation symbol sequence or a codeword bit sequence.

A/N payloads for PUCCH format 3 are respectively configured for respective cells and connected in order of cell index. Specifically, HARQ-ACK feedback bits for a c-th serving cell (or DL CC) are $$o_{c,0}^{ACK} o_{c,1}^{ACK}, \ldots, o_{c,O_c^{ACK}-1}^{ACK} (c \geq 0).$$

Here, $o_c^{ACK}$ denotes the number (i.e. size) of HARQ-ACK payload bits for the c-th serving cell. When a transmission mode supporting single TB transmission is set or spatial bundling is applied to the c-th serving cell, $o_c^{ACK}$ can be set as $o_c^{ACK}=B_c^{DL}$. If a transmission mode supporting transmission of a plurality of (e.g. 2) TBs is set and spatial bundling is not applied to the c-th serving cell, $o_c^{ACK}$ can be set as $o_c^{ACK}=2B_c^{DL}$. When the HARQ-ACK payload bits are transmitted through a PUCCH, or W corresponding to a PUSCH is not present though the HARQ-ACK payload bits are transmitted through the PUSCH (e.g. in case of SPS based PUSCH), $B_c^{DL}$ is set as $B_c^{DL}=M$. Here, M represents the number of elements of set K defined in Table 4. When TDD UL-DL configurations correspond to #1, #2, #3, #4 and #6 and the HARQ-ACK payload bits are transmitted through a PUSCH, $B_c^{DL}=W_{DAI}^{UL}$. Here, $W_{DAI}^{UL}$ denotes a value indicated by a UL DAI (Downlink Assignment Index) field in a UL grant PDCCH and is simply represented as W. In case of TDD UL-DL configuration #5, $B_c^{DL}=W_{DAI}^{UL}+4\lceil (U-W_{DAI}^{UL})/4 \rceil$. Here, U denotes a maximum value from among Ucs, Uc representing the total number of PDSCH(s) received in a subframe n−k and PDCCHs indicating (downlink) SPS release in the c-th serving cell. A subframe n is a subframe in which HARQ-ACK feedback bits are transmitted. ⌈ ⌉ represents a ceiling function.

When a transmission mode supporting single TB transmission is set or spatial bundling is applied to the c-th serving cell, the position of each ACK/NACK in the HARQ-ACK payload of the c-th serving cell is given as $o_{c,DAI(k)-1}^{ACK}$. Here, DAI(k) represents a DL DAI value of a PDCCH detected from a DL subframe n−k. When a transmission mode supporting transmission of a plurality of (e.g. 2) TBs is set and spatial bundling is not applied to the c-th serving cell, the position of each ACK/NACK in the HARQ-ACK payload of the c-th serving cell is given as $o_{c,2DAI(k)-2}^{ACK}$ and $o_{c,2DAI(k)-1}^{ACK}$. $o_{c,2DAI(k)-2}^{ACK}$ represents HARQ-ACK for codeword 0 and $o_{c,2DAI(k)-1}^{ACK}$ represents HARQ-ACK for codeword 1. Codewords 0 and 1 respectively correspond to TBs 0 and 1 or TBs 1 and 0 according to swiping. When PUCCH format 3 is transmitted through a subframe set for SR transmission, PUCCH format 3 is transmitted with ACK/NACK bits and 1-bit SR.

A description will be given of a case in which channel selection using PUCCH format 1b is set. It is assumed that 2 serving cells (i.e. a PCell and an SCell) (or a PCC and an SCC) are aggregated for convenience of description. Description is based on TDD.

A channel selection scheme using PUCCH format 1b when M≤2 in a UL subframe n for HARQ-ACK transmission will first be described. Here, M denotes the number of (i.e. the number of DL SFs corresponding to UL SFs) of elements of set K described above with reference to Table 6. When M≤2 in the UL subframe n, a UE can transmit b(0)b(1) on a PUCCH resource selected from A PUCCH resources $n^{(1)}_{PUCCH,i}$ (0≤i≤A−1 and A ⊂ {2,3,4}). Specifically, the UE transmits an A/N signal in the UL subframe n using PUCCH format 1b according to Table 8, 9 and 10. When M=1 in the UL subframe n, HARQ-ACK(j) denotes an A/N response to a TB or an SPS release PDCCH, which is related to a serving cell c. Here, when M=1, a TB, HARQ-ACK(j) and A PUCCH resources can be given according to Table 11. When M=2 in the UL subframe n, HARQ-ACK(j) denotes an A/N response to a TB or an SPS release PDCCH in DL subframe(s) provided by set K in each serving cell. Here, M=2, subframes and A PUCCH resources in each serving cell for HARQ-ACK(j) can be given according to Table 12.

Table 8 is a mapping table for channel selection, defined in LTE-A when 2 CCs having the same UL-DL configuration are aggregated, M=1 and A=2.

TABLE 8

| HARQ-ACK(0), HARQ-ACK(1) | $n_{PUCCH}^{(1)}$ | b(0) b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

Here, $n^{(1)}_{PUCCH,0}$ can be allocated an implicit PUCCH resource linked to a PDCCH (i.e. PCC-PDCCH) that schedules a PCC (or PCell) and $n^{(1)}_{PUCCH,1}$ can be allocated an implicit PUCCH resource linked to a PDCCH (i.e. SCC-PDCCH) that schedules an SCC or an explicit PUCCH resource reserved through RRC according to whether or not cross-CC scheduling is applied. For example, $n^{(1)}_{PUCCH,0}$ can be allocated an implicit PUCCH resource linked to the PCC-PDCCH and $n^{(1)}_{PUCCH,1}$ can be allocated an implicit PUCCH resource linked to the SCC-PDCCH when cross-CC scheduling is employed.

Table 9 is a mapping table for channel selection, defined in LTE-A when two CCs having the same UL-DL Cfg are aggregated, M=1 and A=3.

TABLE 9

| HARQ-ACK(0), HARQ-ACK(1), HARQ-ACK(2) | $n_{PUCCH}^{(1)}$ | b(0) b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

When a PCC corresponds to a MIMO CC and an SCC corresponds to a non-MIMO CC, $n^{(1)}_{PUCCH,0}$ and $n^{(1)}_{PUCCH,1}$ can be allocated implicit PUCCH resources linked to the PCC-PDCCH and $n^{(1)}_{PUCCH,2}$ can be allocated an implicit PUCCH resource linked to the SCC-PDCCH or an explicit PUCCH resource reserved through RRC according to whether or not cross-CC scheduling is applied. When the PCC corresponds to a non-MIMO CC and the SCC corresponds to a MIMO CC, $n^{(1)}_{PUCCH,0}$ can be allocated an implicit PUCCH resource linked to the PCC-PDCCH and $n^{(1)}_{PUCCH,1}$ and $n^{(1)}_{PUCCH,2}$ can be allocated implicit PUCCH resources linked to the SCC-PDCCH or explicit PUCCH resources reserved through RRC according to whether or not cross-CC scheduling is employed.

Table 10 is a mapping table for channel selection, defined in LTE-A when two CCs having the same UL-DL Cfg are aggregated, M≤2 and A=4.

TABLE 10

| HARQ-ACK(0), HARQ-ACK(1), HARQ-ACK(2), HARQ-ACK(3) | $n_{PUCCH}^{(1)}$ | b(0) b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,1}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

Implicit PUCCH resources linked to a PDCCH (i.e. PCC-PDCCH) that schedules a PCC (or PCell) can be allocated to $n^{(1)}_{PUCCH,0}$ and/or $n^{(1)}_{PUCCH,1}$ irrespective of cross-CC scheduling and implicit PUCCH resource linked to a PDCCH (i.e. SCC-PDCCH) that schedules an SCC or explicit PUCCH resources reserved through RRC can be allocated to $n^{(1)}_{PUCCH,2}$ and/or $n^{(1)}_{PUCCH,3}$ according to whether or not cross-CC scheduling is applied. For example, when M=2 and cross-CC scheduling is applied, implicit PUCCH resources linked to PCC-PDCCHs of first and second DL SFs can be allocated to $n^{(1)}_{PUCCH,0}$ and $n^{(1)}_{PUCCH,1}$ and implicit PUCCH resources linked to SCC-PDCCHs of the first and second DL SFs can be allocated to $n^{(1)}_{PUCCH,2}$ and $n^{(1)}_{PUCCH,3}$.

Table 11 shows TBs, HARQ-ACK(j) and PUCCH resources when M=1.

TABLE 11

| A | HARQ-ACK(j) | | | |
|---|---|---|---|---|
| | HARQ-ACK(0) | HARQ-ACK(1) | HARQ-ACK(2) | HARQ-ACK(3) |
| 2 | TB1 Primary cell | TB1 Secondary cell | NA | NA |
| 3 | TB1 Primary cell | TB1 Secondary cell | TB2 Secondary cell | NA |
| 3 | TB1 Primary cell | TB2 Primary cell | TB1 Secondary cell | NA |
| 4 | TB1 Primary cell | TB2 Primary cell | TB1 Secondary cell | TB2 Secondary cell |

TB denotes a transport block and NA refers to "not available". A is determined by a maximum number of TBs supported in a transmission mode set for each cell and is not related to the number of TBs actually transmitted in each cell.

Table 12 illustrates TBs, HARQ-ACK(j) and PUCCH resources when M=2.

TABLE 12

| A | HARQ-ACK(j) | | | |
|---|---|---|---|---|
| | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

A channel selection scheme using PUCCH format 1b when M>2 in the UL subframe n for HARQ-ACK transmission will now be described first. This channel selection scheme is similar to the channel selection scheme in case of M≤2. Specifically, the UE transmits an A/N signal using PUCCH format 1b in the UL subframe n according to Tables 13 and 14. When M>2 in the UL subframe n, $n^{(1)}_{PUCCH,0}$ and $n^{(1)}_{PUCCH,1}$ are associated with DL transmission (e.g. PDSCH transmission) on the PCell and $n^{(1)}_{PUCCH,2}$ and $n^{(1)}_{PUCCH,3}$ are related to DL transmission (e.g. PDSCH transmission) on the SCell.

HARQ-ACK(i) for an arbitrary cell denotes an A/N response to a PDCCH (PDSCH corresponding thereto) on which DAI-c that schedules the cell is i+1. When a PDSCH w/o PDCCH is present, HARQ-ACK(0) may refer to an A/N response to the PDSCH w/o PDCCH and HARQ-ACK(i) may refer to an A/N response to a PDCCH (PDSCH corresponding thereto) on which DAI-c is i.

Table 13 is a mapping table for channel selection, defined in LTE-A when two CCs having the same UL-DL Cfg are aggregated and M=3.

TABLE 13

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

Here, implicit PUCCH resources linked to a PDCCH (i.e. PCC-PDCCH) that schedules a PCC (or PCell) can be allocated to $n^{(1)}_{PUCCH,0}$ and/or $n^{(1)}_{PUCCH,1}$ irrespective of cross-CC scheduling and implicit PUCCH resource linked to a PDCCH (i.e. SCC-PDCCH) that schedules an SCC or explicit PUCCH resources reserved through RRC can be allocated to $n^{(1)}_{PUCCH,2}$ and/or $n^{(1)}_{PUCCH,3}$ according to whether or not cross-CC scheduling is applied. For example, implicit PUCCH resources linked to PCC-PDCCHs corresponding to DAI-c of 1 and DAI-c of 2 can be allocated to $n^{(1)}_{PUCCH,0}$ and $n^{(1)}_{PUCCH,1}$, respectively, and implicit PUCCH resources linked to SCC-PDCCHs corresponding to DAI-c of 1 and DAI-c of 2 can be allocated to $n^{(1)}_{PUCCH,2}$ and $n^{(1)}_{PUCCH,3}$, respectively, in a TDD situation.

Table 14 is a mapping table for channel selection, defined in LTE-A when two CCs having the same UL-DL Cfg are aggregated and M=4.

TABLE 14

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |

TABLE 14-continued

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

Here, $n^{(1)}_{PUCCH,0}$, $n^{(1)}_{PUCCH,1}$, $n^{(1)}_{PUCCH,2}$, and $n^{(1)}_{PUCCH,1}$ can be allocated as shown in Table 13.

Figure 14:
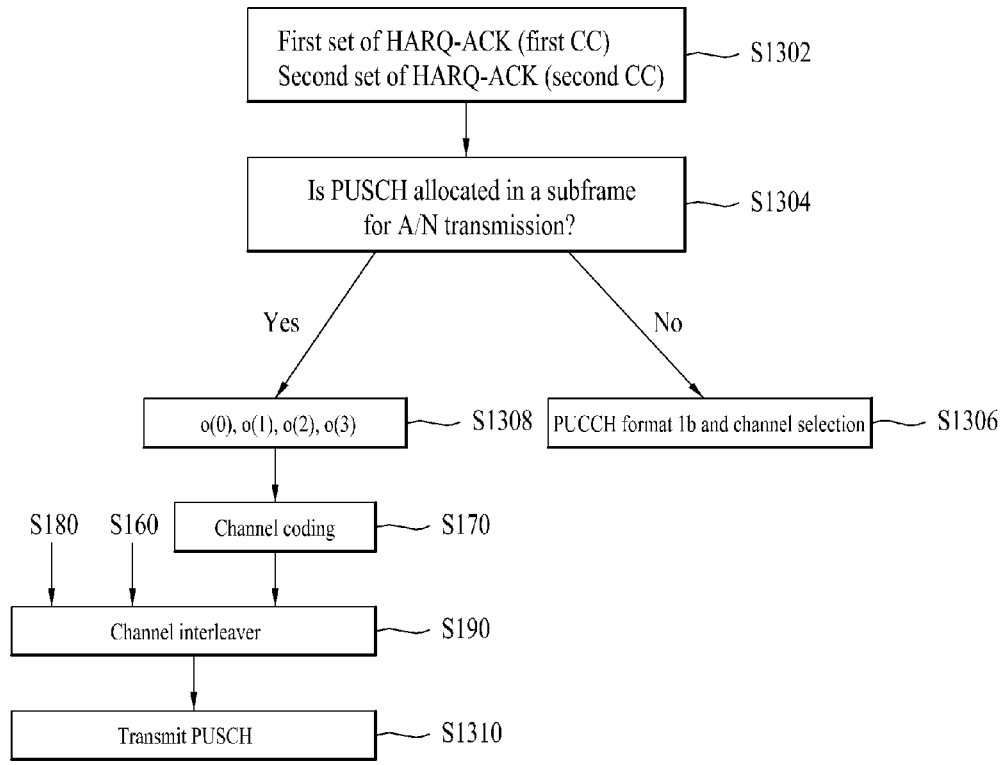
FIG. 14 illustrates a slot level structure of PUCCH format 3.

FIG. 14 illustrates an A/N transmission procedure when channel selection is set. It is assumed that 2 CCs (e.g. a PCC and an SCC) having the same UL-DL configuration are aggregated.

Referring to FIG. 14, a UE generates a first set of HARQ-ACK for a first CC (or cell) and a second set of HARQ-ACK for a second CC (or cell) (S1302). Then, the UE checks whether a PDSCH has been allocated to a subframe (referred to as an A/N subframe hereinafter) for A/N transmission (S1304). When the A/N subframe has no PUSCH allocated thereto, the UE transmits A/N information in PUCCH format 1b by performing channel selection (refer to Table 8 to 14). When the PUSCH has been allocated to the A/N subframe, the UE multiplexes A/N bits to the PUSCH. Specifically, the UE generates a bit sequence (e.g. o(0), o(1), o(2), o(3) in Tables 13 and 14) corresponding to the first set of HARQ-ACK and the second set of HARQ-ACK (S1308). The A/N bit sequence is subjected to channel coding and channel interleaving and transmitted through the PUSCH. Channel coding includes RM (Reed-Muller) coding, tail-biting convolutional coding and the like.

Embodiment

A/N Codebook Size

As described above, a conventional A/N codebook size (i.e. the number of A/N bits constituting A/N feedback information) is determined on the basis of a maximum number Ntb of transmittable TBs, supported by a TM set for a cell.

Only one TB can be transmitted through a PDSCH in a specific subframe irrespective of Ntb set for a cell. In addition, only a specific PDCCH (e.g. SPS release PDCCH) that requires 1-bit A/N feedback may be transmitted or DL data/PDCCH that requires A/N feedback may not be transmitted in a specific subframe. For example, when a TM other than a UE-specific DMRS based TM (e.g. TM 9 or TM 10) is set for a specific cell, only an SPS release PDCCH can be transmitted through a multicast broadcast single frequency network (MBSFN) subframe when the specific cell is a PCell and DL data/PDCCH (which requires A/N feedback) may not be transmitted through the MBSFN subframe when the specific cell is an SCell. Furthermore, a similar operation can be performed in the case of a special subframe (referred to as a shortest S hereinafter) composed of only OFDM symbols with DwPTS of N (N=3) or less (irrespective of TM) in TDD. For example, the shortest S can correspond to special SF configurations #0 and #5 in a DL normal CP case and correspond to special SF configurations #0, #4 and #7 in a DL extended CP.

When it is assumed that the TM of a specific cell is set to Ntb=2 in the above-described situation, 1 bit (in the case of a PCell) or 2 bits (in the case of an SCell) may be unnecessarily wasted during A/N transmission. When the number of aggregated cells increases, A/N transmission performance deterioration and power consumption may be aggravated due to inefficient A/N codebook size determination.

To solve the aforementioned problem, the present invention presents a method for determining an A/N codebook size in consideration of a subframe configuration and characteristic per cell. While the presented method is exemplified based on a method of determining an A/N codebook size in the case of CA of a plurality of cells, the presented method can be applied to a case in which the A/N codebook size is determined in a single cell. The presented method can be applied to both FDD and TDD. The same UL-DL configuration can be set for a plurality of cells in a TDD CA situation. In addition, UL-DL configurations can be independently set for respective cells in a TDD CA situation. The presented method is applicable to A/N transmission through a PUCCH and a PUSCH.

In the following description, the number of DL SFs (referred to as A/N-DL SFs) corresponding to targets of A/N feedback transmitted through one UL subframe (i.e. SF) is defined as M for convenience. M=1 in the case of FDD and M equals the number of elements of set K in Table 6 in the case of TDD. A conventional cell type in which a UE-common RS such as a cell-specific reference signal (CRS) (and/or a channel state information reference signal (CSI-RS)) is continuously transmitted per DL subframe is referred to as a legacy cell type (LCT). A cell type in which a UE-common RS such as an RS for synchronization tracking (and/or CSI-RS) is non-continuously/periodically transmitted is referred to as a new cell type (NCT). In the following description, DL data represents a PDCCH/PDSCH that requires A/N feedback unless otherwise mentioned. For example, the DL data can represent a PDSCH corresponding to a PDCCH (PDSCH w/PDCCH), a PDSCH without a PDCCH (PDSCH w/o PDCCH) (e.g. SPS PDSCH) and a PDCCH indicating SPS release (SPS release PDCCH). Furthermore, a DL SF may include a special SF as well as a normal DL SF. Antenna ports for transmitting a DMRS can include antenna ports #7 to #14 or a subset thereof (on the basis of 3GPP Rel-10).

Figure 15:
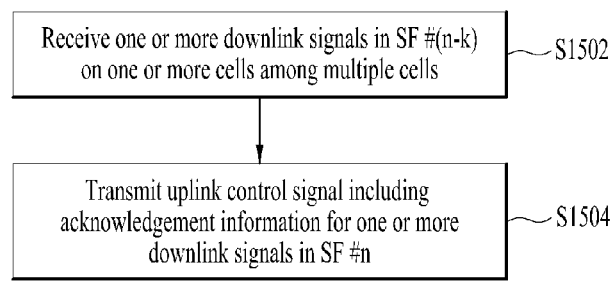
FIG. 15 illustrates an A/N transmission procedure according to an embodiment of the present invention.

FIG. 15 illustrates an A/N transmission procedure according to an embodiment of the present invention. FIG. 15 shows a procedure of determining an A/N codebook size. An A/N transmission procedure according to A/N transmission mode can refer to the aforementioned PUCCH format 3 and channel selection. FIG. 15 illustrates a procedure of a UE and a procedure corresponding thereto may be performed by a BS.

Referring to FIG. 15, a plurality of cells may be configured for a UE in a CA-based wireless communication system. When PUCCH format 3 is set as an A/N transmission mode, the plurality of cells may include two or more cells (i.e. one PCell and one or more SCells). When a channel selection scheme using PUCCH format 1b is set as an A/N transmission mode, the plurality of cells may include two cells (i.e. one PCell and one SCell). In this situation, the UE may receive one or more downlink signals through subframe #(n−k) in one or more cells from among the plurality of cells (S1502). Here, k may be set to a fixed value (e.g. 4) in the case of FDD and to DASI (K: $\{k_0, k_1, \ldots k_{M-1}\}$) of Table 6 in the case of TDD. A downlink signal is a signal that requires acknowledgement information and includes a PDSCH (e.g. PDSCH w/ PDCCH and PDSCH w/o PDCCH) and a PDCCH (e.g. SPS release PDCCH). Subsequently, the UE may transmit an uplink control signal including acknowledgement information about the one or more downlink signals in subframe #n (S1504). The uplink control signal includes a PUCCH signal and a PUSCH signal. The acknowledgement information includes HARQ-ACK information. Here, the number of acknowledgement information bits corresponding to a specific cell from among the plurality of cells in subframe #(n−k) may be set to a first value according to TM of the specific cell when subframe #(n−k) is a first subframe and to a predetermined second value when subframe #(n−k) is a second subframe. Methods for determining an A/N codebook size according to cell type, subframe type and the like will now be described in detail.

Suggestion 1-1: A/N Codebook Size Considering MBSFN Subframe

A TM other than a UE-specific DMRS based TM (or TM based on CSI-RS based channel state measurement/report and DMRS based DL data detection/demodulation) (e.g. TM 9 or TM 10) may be set for a specific cell.

In this case, a method of excluding an MBSFN subframe set for a specific cell from A/N codebook determination (i.e. allocating no A/N bit corresponding to the MBSFN subframe) may be considered. In the case of TDD, the MBSFN subframe can be excluded from A/N-DL SFs for determination of M for a specific cell. Accordingly, when the TM of the specific cell is set to Ntb=2 (or 1), 2-bit A/N may be allocated corresponding to a non-MBSFN subframe of the specific cell and an A/N bit may not be allocated corresponding to the MBSFN subframe of the specific cell. In this regard, when the specific cell is a PCell, the UE can consider that an SPS release PDCCH is not transmitted through the MBSFN subframe. Accordingly, the UE can skip a process of receiving the SPS release PDCCH in the MBSFN subframe of the PCell (e.g. blind decoding using SPS-RNTI). A normal PDCCH reception process (e.g. blind decoding using C-RNTI) can be performed in the MBSFN subframe of the PCell.

Alternatively, it is possible to consider a method of allocating 1 bit to A/N corresponding to the MBSFN subframe all the time irrespective of Ntb set for the PCell only when the specific cell is the PCell. For example, when the TM of the PCell is set to Ntb=2, 2-bit A/N can be allocated for a non-MBSFN subframe and 1-bit A/N can be allocated for the MBSFN subframe. When the TM of an SCell is set to Ntb=2 (or 1), 2-bit (or 1-bit) A/N may be allocated for a non-MBSFN subframe and no A/N bit may be allocated for an MBSFN subframe.

Alternatively, only when a specific cell (operating based on TDD) is a PCell, the number of A/N bits corresponding to an MBSFN subframe is set to Ntb. When the specific cell is an SCell, no A/N bit may be allocated for an MBSFN subframe.

A UE-specific DMRS based TM (or TM based on CSI-RS based channel state measurement/report and DMRS based DL data detection/demodulation) (e.g. TM 9 or TM 10) is set for a specific cell, the aforementioned suggestion is applicable to a subframe (or a subframe other than subframes designated to transmit a non-MBSFN signal (i.e. UE-specific data)) which is designated to transmit an MBSFN signal (e.g. physical multicast channel (PBCH)) from among subframes in an MBSFN subframe set, which is set for the specific cell because A/N feedback is not required for the MBSFN signal.

Suggestion 1-2: A/N Codebook Size Considering Small System BW

A UE-specific DMRA based TM (or TM based on CSI-RS based channel state measurement/report and DMRS based DL data detection/demodulation) (e.g. TMs 8, 9 10) may be set for a specific cell in which system BW corresponds to K or less RBs. In this case, 1-bit A/N is always allocated to a subframe in which a PBCH/PSS/SSS is transmitted in the specific cell, desirably, a subframe in which the PBCH/PSS/SSS and a UE-specific DMRS overlap on the same OFDM symbol in the same RB, irrespective of Ntb set for the specific cell. K may be 6 or 7 (the PBCH/PSS/SS are transmitted over the BW of the corresponding cell when K=6). A DMRS is not transmitted in the corresponding subframe in order to avoid overlapping of the UE-specific DMRS and the PBCH/PSS/SSS on the same OFDM symbol in the same RB, and thus the UE can expect only CRS-based DL data transmission (i.e. fallback with a single TB) using DCI format 1A in the corresponding subframe. The PSS/SSS can be transmitted in subframes #0/#5 per radio frame in FDD and transmitted in subframes #1/#6 per radio frame in TDD. However, the subframes in which the PSS/SSS are transmitted are not limited thereto. The PBCH can be transmitted in subframe #0 for every 4 radio frames irrespective of frame structure type. Accordingly, when the TM of a specific cell composed of K or less RBs corresponds to Ntb=2, 1-bit A/N can be allocated with respect to subframes #0/#5 and 2-bit A/N can be allocated for other subframes in FDD. Similarly, 1-bit A/N can be allocated with respect to subframes #0/#1/#6 and 2-bit A/N can be allocated for other subframes in TDD.

K may be signaled or a cell to which the suggested method is applied may be indicated. Even in this case, the UE can consider that only a single TB can be transmitted in PBCH/PSS/SSS transmission subframes or PBCH/PSS/SSS transmission subframes of the indicated cell in the cell composed of K or less RBs. Furthermore, when a subframe designated/set such that a DMRS is not transmitted therein (or a subframe other than subframes designated/set such that the DMRS can be transmitted therein) is present for a specific cell set to a UE-specific DMRS based TM (or TM based on CSI-RS based channel state measurement/report and DMRS based DL data detection/demodulation) (e.g. TMs 8, 9 and 10), the present suggestion is applicable to the corresponding subframe.

Suggestion 1-3: A/N Codebook Side Considering New Special SF (S) Configuration

Different TDD systems (e.g. an LTE TDD system and a time-division synchronous CDMA (TD-SCDMA system) may be deployed on contiguous frequencies. In this case, introduction of S configuration (referred to as new-S (n-CP)) in which DwPTS is composed of 6 OFDM symbols in the case of DL normal CP and S configuration (referred to as new-S (e-CP)) in which DwPTS is composed of 5 OFDM symbols in the case of DL extended CP is considered for avoidance of mutual interference and stable coexistence. The following TM operation and RS configuration may be applied in consideration of the aforementioned DwPTS configurations.

In the case of TMs 8, 9 and 10
  New-S (n-CP): this supports data demodulation based on a DMRS transmitted through the third and fourth OFDM symbols in the first slot (of DwPTS) using antenna ports #7 to #10.
  New-S (e-CP): this does not support DMRS based demodulation.
In the case of TM 7
  New-S (e-CP): this supports data demodulation based on a DMRS transmitted through the fifth OFDM symbol in the first slot (of DwPTS) using antenna port #5.
  New-S (n-CP): this does not support DMRS based demodulation.

Accordingly, a UE operating in TMs 8, 9 and 10 can expect only CRS based DL data transmission (i.e. fallback with a single TB) using DCI format 1A in a new-S (e-CP) (similarly to the aforementioned "small system BW" case). Therefore, when a UE-specific DMRS based TM (or TM based on CSI-RS based channel state measurement/report and DMRS based DL data detection/demodulation) (e.g. TMs 8, 9 and 10) is set for a specific cell in which a new-S (e-CP) is set as S configuration, it is possible to consider a method of allocating 1-bit A/N all the time for a special SF in the specific cell irrespective of Ntb set for the specific cell.

Suggestion 1-4: A/N Codebook Size Considering Shortest S in NCT

When a shortest S is set for LCT in a TDD situation, only an SPS release PDCCH can be transmitted through the shortest S when the LCT corresponds to a PCell, whereas any DL data/PDCCH (which require A/N feedback) is not transmitted through the shortest S when the LCT corresponds to an SCell because DwPTS of the shortest S is composed of an L-PDCCH region only. In a next NCT, however, DL data scheduling based on the E-PDCCH only without the L-PDCCH can be applied. In this case, the E-PDCCH/PDSCH can be allocated to a subframe starting from the first OFDM symbol thereof. Accordingly, there is a possibility that DL data and an E-PDCCH that schedules the DL data are frequency-division-multiplexed through the shortest S and transmitted in the NCT. However, since the shortest S (DwPTS in the corresponding S) is composed of only a small number of OFDM symbols, a UE-specific DMRS structure that has a relatively low density or supports low ranks can be applied for the shortest S in consideration of RS overhead, compared to other subframes. Therefore, a maximum number of TBs that can be transmitted through the shortest S can be limited to one. Accordingly, when the shortest S is set for a specific NCT based on TDD, 1-bit A/N is allocated for the corresponding S all the time irrespective of Ntb set for the specific NCT.

All the suggested methods described above may be limited and applied to a case in which the A/N transmission mode is set to PUCCH format 3.

Suggestion 2-1: Simultaneous Transmission of Channel Selection Based A/N and Periodic CSI When A/N transmission timing and periodic CSI transmission timing overlap in the same UL SF while the A/N transmission mode is set to channel selection in LTE-A, the A/N and the CSI are simultaneously transmitted using PUCCH format 2/2a/2b if the A/N satisfies specific conditions. When the A/N does not satisfy the specific conditions, CSI transmission is abandoned (e.g. dropped) and only the A/N is transmitted through channel selection. The specific conditions include a case in which the A/N corresponds to only A/N for DL data received through a PCell. That is, the specific conditions include a case in which only DL data transmitted on the PCell is received in an A/N-DL SF corresponding to the UL SF. The present suggestion may correspond to an operation in a state in which simultaneous transmission of A/N and CSI is permitted through higher layer signaling (e.g. "Simultaneous-AN-and-CQI" parameter=ON).

M for the PCell may be 0 according to suggestions 1-1 to 1-4 or for other reasons. Even in this case, while whether to simultaneously transmit A/N and CSI can be determined according to a conventional scheme, the target of the specific conditions for determining simultaneous transmission of A/N and CSI may be extended to A/N for all cells (PCell and SCell) in order to further reduce CSI drop and further increase CSI transmission opportunity. That is, the target of the specific conditions can be changed to A/N for an SCell since A/N corresponding to the PCell is not present. Since only aggregation of two cells (i.e. the PCell and the SCell) is considered when the A/N transmission mode is set to channel selection, A/N information confusion does not occur even when the target of the specific conditions is changed to A/N for the SCell.

Specifically, when A/N transmission timing and CSI transmission timing overlap in the same UL SF in the channel selection mode and M for a PCell corresponding to the UL SF is 0, a method of simultaneously transmitting the corresponding A/N and CSI using PUCCH format 2/2a/2b (without checking whether the specific conditions are satisfied and dropping the CSI) can be considered. In this case, TPC in a PDCCH that schedules an A/N-DL SF of an SCell, which corresponds to the UL SF, can be used for power control (instead of signaling ARI indicating an A/N transmission resource). Control information transmission according to the suggested method can be arranged as follows according to data reception state in A/N-DL SF(s) and subframe state.

When DL data is received in a PCell only: A/N and CSI are simultaneously transmitted using PUCCH format 2/2a/2b.

When DL data is received in both a PCell and an SCell: A/N is transmitted using channel selection and CSI transmission is dropped.

When M is equal to or greater than 1 for the PCell and DL data is received in the SCell only: A/N is transmitted using channel selection and CSI transmission is dropped.

M is 0 for the PCell and DL data is received in the SCell only: A/N and CSI are simultaneously transmitted using PUCCH format 2/2a/2b.

Suggestion 2-2: Simultaneous Transmission of A/N and Periodic CSI Based on PUCCH Format 3

When the A/N transmission mode is set to PUCCH format 3 and A/N transmission timing and periodic CSI transmission timing overlap in the same UL SF in LTE-A, A/N and CSI are simultaneously transmitted using PUCCH format 2/2a/2b when the A/N satisfies specific conditions. When the A/N does not satisfy the specific conditions, CSI transmission is abandoned (e.g. dropped) and only the A/N is transmitted through PUCCH format 3. The specific conditions include a case in which the A/N corresponds to only A/N for specific DL data received through a PCell. Here, the specific DL data includes DL data corresponding to a DAI initial value (e.g. 1) or DL data (e.g. an SPS PDSCH) having no DAI (i.e. PDCCH). The present suggestion may correspond to an operation in a state in which simultaneous transmission of A/N and CSI is permitted through higher layer signaling (e.g. "Simultaneous-AN-and-CQI" parameter=ON).

M for the PCell may be 0 according to suggestions 1-1 to 1-4 or for other reasons. Even in this case, while whether to simultaneously transmit A/N and CSI can be determined according to a conventional scheme, the target of the specific conditions for determining simultaneous transmission of A/N and CSI may be changed to A/N for a specific SCell (since A/N corresponding to the PCell is not present) in order to further reduce CSI drop and further increase CSI transmission opportunity.

Specifically, when A/N transmission timing and CSI transmission timing overlap in the same UL SF in PUCCH format 3 mode and M for a PCell corresponding to the UL SF is 0, the corresponding A/N and CSI can be simultaneously transmitted using PUCCH format 2/2a/2b if the A/N corresponds to only A/N for one specific piece of DL data received through the specific SCell. In other cases, CSI transmission can be abandoned (e.g. dropped) and only the A/N can be transmitted through PUCCH format 3. Here, the specific DL data includes DL data corresponding to a DAI initial value (e.g. 1) or DL data having no DAI (i.e. PDCCH). The specific SCell may be an SCell having a lowest cell index (e.g. ServCellIndex or SCellIndex). Otherwise, the specific SCell may be an SCell having a lowest cell index (e.g. ServeCellIndex or SCellIndex) from among SCells for which M corresponding to the UL SF is not 0. TPC in a PDCCH that schedules an A/N-DL SF of the specific SCell, which corresponds to the UL SF, and/or corresponds to a DAI initial value (e.g. 1) can be used for power control (instead of AIR signaling).

Control information transmission according to the suggested method can be arranged as follows according to data reception state in A/N-DL SF(s) and subframe state. A case in which 3 cells (i.e. a PCell, SCell #1 and SCell #2) are configured is assumed for convenience.

When DL data is received in the PCell only: A/N and CSI are simultaneously transmitted using PUCCH format 2/2a/2b.

When DL data is received in the PCell and SCell (SCell#1 and/or SCell#2): A/N is transmitted using PUCCH format 3 and CSI transmission is dropped.

When M is equal to or greater than 1 in the PCell and DL data is received in the SCell (SCell#1 and/or SCell#2) only: A/N is transmitted using PUCCH format 3 and CSI transmission is dropped.

When M is 0 in the PCell and DL data is received in SCell#1 only: A/N and CSI are simultaneously transmitted using PUCCH format 2/2a/2b.

When M is 0 in the PCell, M is equal to or greater than 1 in SCell#1 and DL data is received in SCell#2 only: A/N is transmitted using PUCCH format 3 and CSI transmission is dropped.

M is 0 in the PCell and DL data is received in both SCell#1 and SCell#2: A/N is transmitted using PUCCH format 3 and CSI transmission is dropped.

When M is 0 in the PCell, M is 0 in SCell#1 and DL data is received in SCell#2 only: A/N and CSI are simultaneously transmitted using PUCCH format 2/2a/2b.

Whether to apply suggestions 1-1 to 2-2 may be set cell-specifically or UE-specifically through broadcast/RRC (Radio Resource Control)/L1 (Layer 1)(e.g., PDCCH)/L2 (Layer 2)(e.g., MAC (Medium Access Control)) signaling in the present invention.

Figure 16:
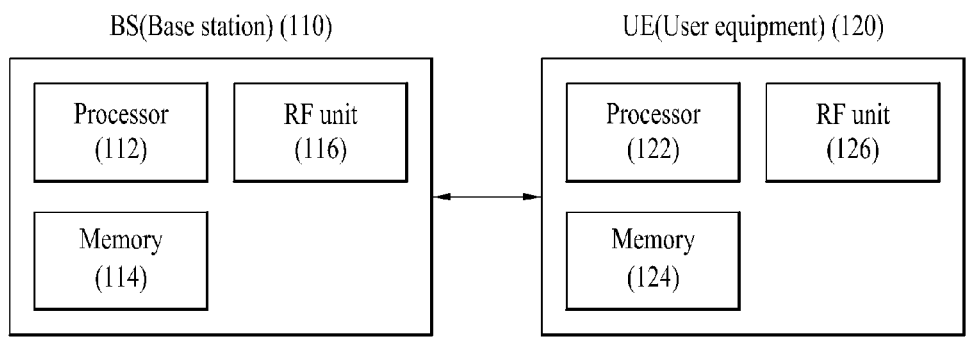
FIG. 16 illustrates a BS and a UE applicable to the present invention.

FIG. 16 illustrates a BS and a UE to which embodiments of the present invention are applicable. When a wireless communication system includes a relay, the BS or the UE can be replaced by the relay.

Referring to FIG. 16, the wireless communication system includes the BS 110 and the UE 120. The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc. The term terminal may be replaced with the terms UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for wireless communication apparatuses such as a UE, a relay, a BS, etc.

The invention claimed is:

1. A method for transmitting an uplink control signal by a communication apparatus for which a plurality of cells is configured in a carrier aggregation-based wireless communication system, the method comprising:
   receiving, in one or more cells from among the plurality of cells, one or more downlink signals in subframe #(n−k); and
   transmitting, in subframe #n, an uplink control signal including acknowledgement information on the one or more downlink signals,
   wherein the number of acknowledgement information bits corresponding to a specific cell from among the plurality of cells in the subframe #(n−k) is given as a first value of 1 or 2 according to a transmission mode of the specific cell when the subframe #(n−k) is a non-MBSFN (Multicast Broadcast Single Frequency Network) subframe, and given as a predetermined second value when the subframe #(n−k) is an MBSFN subframe, and
   wherein the predetermined second value is 1 when the specific cell is a primary cell (PCell) and 0 when the specific cell is a secondary cell (SCell).

2. The method according to claim 1, wherein the specific cell is a cell composed of a specific number of resource blocks (RBs) or less, the non-MBSFN subframe is a subframe having no broadcast channel and synchronization channel, and the MBSFN subframe is a subframe having at least one of a broadcast channel and a synchronization channel.

3. The method according to claim 1,
   wherein the non-MBSFN subframe includes a downlink (DL) subframe or a first special subframe and the MBSFN subframe includes a second special subframe, and
   wherein the first special subframe is a subframe in which the number of orthogonal frequency division multiplexing (OFDM) symbols reserved for DL transmission is greater than N and the second special subframe is a subframe in which the number of OFDM symbols reserved for DL transmission is equal to or less than N.

4. The method according to claim 1, wherein the uplink control signal is transmitted using a physical uplink control channel (PUCCH) format 3 or a channel selection scheme.

5. A communication apparatus configured to transmit an uplink control signal in a carrier aggregation-based wireless communication system, comprising:
   a radio frequency (RF) unit; and
   a processor,
   wherein the processor is configured to receive, in one or more cells from among a plurality of cells, one or more downlink signals in subframe #(n−k) and to transmit, in subframe #n, an uplink control signal including acknowledgement information on the one or more downlink signals,
   wherein the number of acknowledgement information bits corresponding to a specific cell from among the plurality of cells in the subframe #(n−k) is given as a first value of 1 or 2 according to a transmission mode of the specific cell when the subframe #(n−k) is a non-MBSFN (Multicast Broadcast Single Frequency Network) subframe, and given as a predetermined second value when the subframe #(n−k) is a MBSFN subframe, and
   wherein the predetermined second value is 1 when the specific cell is a primary cell (PCell) and 0 when the specific cell is a secondary cell (SCell).

6. The communication apparatus according to claim 5, wherein the specific cell is a cell composed of a specific number of RBs or less, the non-MBSFN subframe is a subframe having no broadcast channel and synchronization channel, and the MBSFN subframe is a subframe having at least one of a broadcast channel and a synchronization channel.

7. The communication apparatus according to claim 5,
   wherein the non-MBSFN subframe includes a DL subframe or a first special subframe and the MBSFN subframe includes a second special subframe, and
   wherein the first special subframe is a subframe in which the number of OFDM symbols reserved for DL transmission is greater than N and the second special subframe is a subframe in which the number of OFDM symbols reserved for DL transmission is equal to or less than N.

8. The communication apparatus according to claim 5, wherein the uplink control signal is transmitted using a PUCCH format 3 or a channel selection scheme.

* * * * *